Sept. 20, 1938.　　　H. J. SCHELHAMMER　　　2,130,905
METHOD OF PRODUCING HARD RUBBER PRODUCTS
Filed Jan. 24, 1936
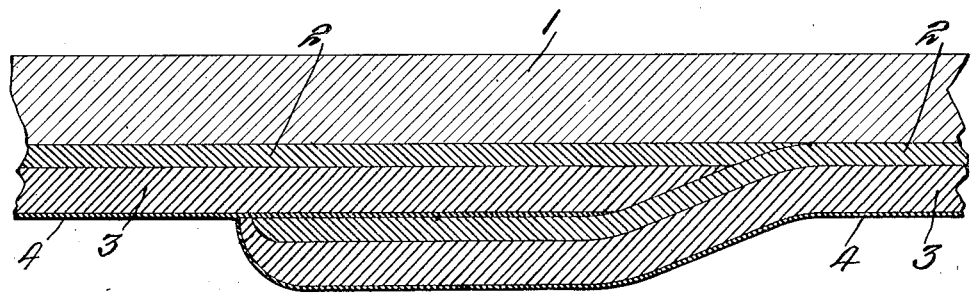
INVENTOR
HERMAN J. SCHELHAMMER
BY
English and Studwell
ATTORNEYS Patented Sept. 20, 1938

2,130,905

UNITED STATES PATENT OFFICE 2,130,905

METHOD OF PRODUCING HARD RUBBER PRODUCTS

Herman J. Schelhammer, Whitestone, N. Y., assignor to American Hard Rubber Company, New York, N. Y., a corporation of New York Application January 24, 1936, Serial No. 60,561

8 Claims. (Cl. 18—59)

The invention relates to an improvement in methods of producing hard rubber products, and is more particularly an improvement in providing hard rubber products with a smooth, glossy surface.

Hard rubber products consisting essentially of vulcanized rubber and sulphur, and more especially hard rubber products consisting of rubber, rubber dust, sulphur and a filler such as silica or asbestos, are employed for a great variety of uses and range in size from such articles as small buttons to the linings for tanks 10 feet and more in diameter and 20 feet and more in length. Hard rubber products are produced by molding a suitable hard rubber compound and then vulcanizing it, or by coating or lining other substances such as wood or metal with the hard rubber compound and then vulcanizing it. Although the invention is applicable to the production of a wide range of products composed either wholly of a vulcanized hard rubber compound or a hard rubber compound applied to other substances, for the sake of convenience of description, the invention will be described with particular reference to the coating of sheet metal and the like, and more especially to the lining of metal tanks with hard rubber compounds. The industrial arts employ in large numbers metal tanks, pipes and fittings, and the like, for the storage, processing and the transportation of chemicals which have a corrosive action upon metal, and it is customary to protect the exposed surfaces of this equipment with a layer of hard rubber which is acid and corrosion resisting.

In lining tanks and other receptacles adapted to contain hot and cold acids and other corrosive fluids it has been customary to coat the exposed surface with superposed layers of soft and hard rubber compounds or with superposed layers of soft, hard and soft rubber compounds, and then subject the lined tank to vulcanizing treatment of live steam or hot water. In the usual practice of lining the tanks a layer of soft rubber compound is secured to the metal, wood or other substance composing the tank by rubber cement or other suitable cement-like material and then a layer of hard rubber compound is applied to the exposed surface of the soft rubber compound. For protection against mechanical damage to the hard rubber, it has also been proposed to apply a second layer of soft rubber compound on the layer of hard rubber compound. The present invention is primarily concerned with a lining consisting of a layer of hard rubber compound coating the sheet metal, with or without the interposition of a layer of soft rubber compound or cushion between the metal and the layer of hard rubber compound.

The former methods of vulcanizing the hard rubber compound forming the inner layer or exposed lining of the tank by steam leaves the surface of the hard rubber compound rough and leathery, with minute uneven recesses or depressions therein, which increase with the amount of sulphur, hard rubber dust and filler in the compound. The surface color is dull and is frequently of a yellowish appearance. At the beginning of the vulcanization of the rubber lined tanks when vulcanizer and tank are cold and also during the process of vulcanization the steam condenses on the walls of vulcanizer as well as on surfaces of tank and drops on the exposed surfaces of the rubber, especially in the bottom of the tank; and while the rubber is still in the unvulcanized state it will absorb some of the water, especially as the water is distilled and hot, thereby causing the surface of the rubber to absorb water and to assume a yellowish appearance as well as to have the coarse, rough and somewhat pitted and soft texture. Tanks and the like would present a better appearance and be more marketable if the exposed surface could be made of an even shiny black color in the nature of an enameled surface. Also, such a surface could be more readily cleaned, which would be advantageous, especially where different colored dyes are successively used in one tank. Inasmuch as the smooth shiny surface is obtained by the use of the best hard rubber compounds, the corrosion-resisting qualities of the surface will also be improved.

In order to eliminate the former objectionable finish of the exposed surface of hard rubber linings of metal tanks and other receptacles, it has been proposed heretofore to cover the surface of the hard rubber compound with tin or aluminum foil sheathing, especially where it is necessary to cure or vulcanize the rubber in boiling water. When the vulcanization has been completed the tin or aluminum foil is removed from the rubber and leaves its surface in a hard, smooth, glossy black condition, which is not only pleasing in appearance but is more highly resistant to the corrosive action of acids and other chemicals, and can be cleaned more readily than a rough surface. This method of securing a smooth black and glossy surface on the hard rubber lining of the tank, however, has several disadvantages which preclude its universal adoption. In the first place it is expensive, and in the second place it is adapted only for unbroken straight surfaces and cannot be employed satisfactorily around inlet and outlet openings, manholes, and the like. Moreover, in applying the tin or aluminum foil to the surface of the hard rubber compound, it is necessary to prevent the formation of air pockets and also to have the seams so tight as to prevent steam or the condensation thereof from getting below the tin sheets and so attacking the rubber and thereby producing a pitted uneven surface. As a result of the difficulty of employing tin and aluminum foil to secure a smooth black and glossy surface on the hard rubber lining, it is common practice to do away with the use of tin and aluminum foil and vulcanize the hard rubber compound lining directly with steam, in spite of the fact that it has the objectionable effect on the surface described above.

The object of the present invention is to provide a method whereby the exposed surfaces of products consisting of hard rubber compounds may be given a smooth, glossy black appearance without the use of tin or aluminum foil sheathing during the step of vulcanization, and more particularly to produce a method of lining metal tanks and other receptacles with a layer of vulcanized corrosion-resisting hard rubber having a smooth, glossy black surface. To this end the invention consists in the improved hard rubber product and the method of producing it hereinafter fully described and particularly pointed out in the appended claims.

In the accompanying drawing is illustrated a rigid wall composed of metal, wood, or other suitable material coated with a layer of vulcanized soft rubber, a layer of vulcanized hard rubber, and an additional very thin layer of shiny hard rubber applied thereto according to the principle of the present invention.

The rigid wall is indicated in the drawing by the reference numeral 1 and the corrosion-resisting coating or lining as shown at an overlapping joint. The layer of vulcanized soft rubber compound is of usual composition containing two to three parts sulphur and is indicated at 2. The layer of hard rubber compound, indicated at 3, may be composed of the usual hard rubber compound ingredients. The sulphur content may vary from 25 to 50 parts, according to the hardness desired in the finished hard rubber lined product. A satisfactory composition, without considering the accelerator, may be composed of substantially 100 parts rubber, 30 parts hard rubber dust, 35 parts sulphur and 40 parts filler. A hard rubber compound for the lining 3 consisting of 100 parts rubber and 25 to 50 parts sulphur could also be used; but in general it is best to use compounds having fillers and hard rubber dust, and fillers especially are used if the tank is to be subjected to high temperatures. It is also advisable to use hard rubber dust because if only rubber and sulphur compounds are used, the lining during vulcanization may become so soft as to lose its position; furthermore, the addition of hard rubber dust reduces the amount of shrinkage during and after vulcanization, which is of importance, especially in large tanks. Coating and protecting the layer of hard rubber compound 3 is a thin veneer of hard rubber 4, usually about ten thousandths of an inch in thickness and preferably not more than fifteen thousandths of an inch.

In carrying out the improved method of producing a smooth, glossy black surface on hard rubber products and more specifically in producing such a surface on the hard rubber lining of enclosed tanks or other receptacles, the tank is first provided with a layer of unvulcanized soft rubber compound 2 which may be cemented to the rigid wall 1 of the tank in the usual manner. Over the soft rubber compound 2 is laid a coating of unvulcanized hard rubber compound 3. The thin veneer of hard rubber 4 may be applied in the unvulcanized state to the inner surface of the unvulcanized hard rubber compound 3 in a number of ways, as for example, by plating a calendered rubber sheet or by spraying or brushing latex or rubber cement on top of the hard rubber compound lining after the latter has been applied on the soft rubber layer. One or more coats of the pure rubber cement or latex may be applied, permitting each coat to dry before the next is applied. The difficulty in the spraying or brushing procedure is to secure a thin rubber veneer of equal thickness throughout the tank, and accordingly, I prefer the following method of application of the thin rubber veneer to the hard rubber compound:—The layer of hard rubber compound 3 is calendered in the usual manner and may conveniently have a thickness of between $\frac{3}{32}$" and ¼". The calendered sheet of hard rubber liner 3 is coated with a calendered sheet of thin rubber which consists preferably of rubber only, except for 1 or 2 parts of one of the usual accelerators, and the thickness of the sheet of rubber veneer is preferably about ten thousandths of an inch, and in the preferred practice is not permitted to extend much beyond fifteen thousandths of an inch. It has been found by repeated experiments that the thinner the sheet of rubber veneer the harder it becomes during the process of vulcanization. In actual practice the soft rubber liner, hard rubber liner, and thin rubber veneer are calendered and plated together and applied as a single unit to the tank wall or vessel. Instead of a sheet of pure rubber, a veneer of rubber and sulphur can sometimes be used to good advantage, with the amount of sulphur preferably between 2 and 5 parts, although it may be as high as 50 parts to 100 parts of rubber. However, it has been found that the higher the sulphur content, the less shiny the surface of the rubber will be after vulcanization; and so for the best results not more than 5 parts of sulphur should be used to 100 parts of rubber.

The complete structure is now ready for vulcanization. This is carried out in the preferred method of procedure by placing the tank in the vulcanizer and subjecting it to dry air at a temperature ranging from 250° to about 340° F., but preferably at about 290° F., for about 30 minutes to one hour, at a pressure of about 5 pounds. The effect of subjecting the rubber veneer to this dry vulcanization is to cause the inner or exposed surface of the rubber veneer to become soft and shiny and then partially vulcanize. Since the rubber veneer, in the cases in which no sulphur is added to the rubber, contains no foreign substance except 1 or 2 parts of accelerator, it cannot of course vulcanize unless it receives by migration sulphur from the hard rubber compound which it covers, and since the rubber partially vulcanizes during the hot air treatment, that is an indication that the rubber veneer has received sulphur from the hard rubber compound. This preliminary step of hot dry air treatment is sufficient to assist in setting the surface of the rubber veneer so that the subsequent vulcanization treatment thereof either by steam or hot water will not result in the formation of pits or depressions therein and will not result in water-soaked discoloration thereof. When the exposed surface of the rubber veneer has been properly set by partial vulcanization, the interior of the tank or other receptacle is then subjected to the usual steam vulcanization process which consists in admitting to the interior of the vulcanizer steam at about 285° F., or 40 lbs. pressure, for about 4 to 8 hours, depending upon the hardness desired. Although the vulcanizing temperature of the steam is preferably substantially 285° F., satisfactory results have been obtained by using steam having varying temperatures from about 260° F. to 340° F. It has been found that if complete vulcanization is effected with hot air alone, the veneer will not be as hard and shiny and the physical characteristics of the compound, such as tensile strength and elongation, will be reduced so that it is advantageous to use steam as the final curing agent as soon as the rubber veneer has sufficiently set.

The result of this method of procedure is a thin veneer of black, glossy, hard rubber on the layer of hard rubber compound. The rubber veneer is of course thin in comparison with the thickness of the hard rubber compound, and consequently the sulphur which migrates during the process of vulcanization from the layer of hard rubber compound into the veneer of rubber does not subtract from the hard rubber compound sufficient sulphur to affect the hardening or curing of the hard rubber compound, while it is sufficient to cause the thin rubber veneer to convert into a black, smooth and shiny coating over the hard rubber compound.

It is important to keep the air cure as short as possible in order to prevent, as much as possible, oxidation of the heated rubber veneer, as this would be detrimental to the rubber as well as to the surface of the veneer. In the case of large tanks, if too much time is required to raise the temperature to the required degree, it is of advantage to use an inert gas instead of air, and either $CO_2$ or $N_2$ will give satisfactory results. If the hardness of the rubber veneer is the controlling factor rather than a smooth glossy surface, an amount of sulphur may be added to the rubber veneer 4 which will give the required hardness.

This method of providing a shiny, thin rubber veneer on the hard rubber linings of tanks may be applied to various other hard rubber articles which are usually not molded, but cured on cores or mandrels in air, steam, or water, such for instance as battery jars, pipes and fittings, manifolds, and numerous other articles composed entirely of hard rubber or coated with it.

Having thus described the invention, what I claim as new is:—

1. The method of coating sheet metal and the like with corrosion-resisting hard rubber which consists in attaching a layer of hard rubber compound to the metal, applying a veneer of substantially pure rubber of not more than fifteen one-thousandths of an inch on the hard rubber compound, subjecting the whole to a dry cure in gas at substantially 290° F., under pressure, to glaze and partially vulcanize the veneer of rubber, and then subjecting the whole to vulcanization by steam.

2. The method of lining sheet metal tanks and the like with corrosion-resisting hard rubber which consists in attaching a layer of hard rubber compound to the sheet metal, applying to the hard rubber compound a veneer of pure rubber of substantially ten one-thousandths of an inch in thickness, subjecting the whole to a dry cure of air or inert gas at a temperature not lower than substantially 250° F. and not higher than substantially 340° F. under pressure of about 5 pounds to glaze and partially vulcanize the rubber veneer, and then subjecting the whole to vulcanization by steam whereby the rubber veneer is converted into hard rubber.

3. The method of producing a smooth, glossy surface on hard rubber products, which consists in forming a body of the desired shape with its outer portion composed of unvulcanized hard rubber compound, applying to the hard rubber compound a thin veneer of substantially pure rubber of about 10 one-thousandths of an inch in thickness, subjecting the body to hot gas of about 290° F. at 5 pounds pressure for about 30 minutes to an hour, and then subjecting the body to live steam at about 285° F. for about 4 to 8 hours.

4. The method of coating sheet metal and the like with a corrosion-resisting lining which consists in applying a layer of soft rubber compound to the metal, a layer of hard rubber compound on the layer of soft rubber and a thin veneer of substantially pure rubber of not more than fifteen one-thousandths of an inch in thickness on the hard rubber layer and incapable in itself of being vulcanized into hard rubber, then subjecting the whole to hot gases under pressure at a selected temperature in the range of 250° F. to 340° F., to glaze and partially vulcanize the veneer of rubber and then subjecting the whole to steam vulcanization.

5. The method of producing a smooth, glossy surface on a product composed of hard rubber compound which consists in coating the hard rubber compound with a veneer of substantially pure rubber of not more than fifteen one-thousandths of an inch in thickness and incapable in itself of being vulcanized into hard rubber, subjecting the whole to a dry cure in air or inert gas at substantially 290° F. under pressure, to glaze and partially vulcanize the veneer of rubber, and then subjecting the whole to vulcanization by live steam.

6. The method of producing a smooth, glossy surface on a product composed of hard rubber compound which consists in coating the hard rubber compound with a veneer of substantially pure rubber of substantially ten one-thousandths of an inch in thickness and incapable in itself of being vulcanized into hard rubber, subjecting the whole to a dry cure of air or inert gas at a temperature not lower than substantially 250° F. and not higher than substantially 340° F. under pressure of about five pounds to glaze and partially vulcanize the rubber veneer, and then subjecting the whole to vulcanization by steam.

7. The method of producing a smooth, glossy surface on hard rubber products which consists in forming a body of the desired shape with its outer portion composed of unvulcanized hard rubber compound, applying to the hard rubber compound a thin veneer of unvulcanized substantially pure rubber of not more than fifteen one-thousandths of an inch in thickness and incapable in itself of being vulcanized into hard rubber, then partially vulcanizing the rubber veneer by subjecting the body to hot gas at substantially 290° F. for a period sufficient to cause a glaze on the surface of the veneer and the migration of sulphur from the hard rubber compound into the rubber veneer to set the latter against alteration of its surface, and then subjecting the body to vulcanization to vulcanize the hard rubber compound and convert the rubber veneer into hard rubber by the further migration of sulphur into the rubber veneer.

8. The method of producing a smooth, glossy surface on hard rubber products, which consists in forming a body of the desired shape with its outer portion composed of unvulcanized hard rubber compound, applying to the hard rubber compound a thin veneer of unvulcanized substantially pure rubber of not more than substantially fifteen one-thousandths of an inch in thickness and incapable in itself of being converted into hard rubber, subjecting the body to hot gas of substantially 290° F. to set the surface of thin rubber veneer against alteration, and then subjecting the body to vulcanization treatment to vulcanize the hard rubber compound and convert the thin rubber veneer into hard rubber by the interaction between it and the hard rubber compound.

HERMAN J. SCHELHAMMER.